US012669747B2

(12) United States Patent
Joseph et al.

(10) Patent No.: US 12,669,747 B2
(45) Date of Patent: Jun. 30, 2026

(54) SYSTEM FOR GENERATING A 360 DEGREE VIEWABLE IMAGE ON LAMINAR FOG SCREEN

(71) Applicant: Disney Enterprises, Inc., Burbank, CA (US)

(72) Inventors: Daniel M. Joseph, Windermere, FL (US); Jessica Klouda, Winter Garden, FL (US)

(73) Assignee: Disney Enterprises, Inc., Burbank, CA (US)

( * ) Notice: Subject to any disclaimer, the term of this patent is extended or adjusted under 35 U.S.C. 154(b) by 433 days.

(21) Appl. No.: 18/505,097

(22) Filed: Nov. 8, 2023

(65) Prior Publication Data

US 2025/0147401 A1    May 8, 2025

(51) Int. Cl.
| | |
|---|---|
| *G03B 21/60* | (2014.01) |
| *A63J 5/02* | (2006.01) |
| *G03B 21/12* | (2006.01) |
| *G03B 21/608* | (2014.01) |
| *G03B 35/20* | (2021.01) |
| *H04N 9/31* | (2006.01) |

(52) U.S. Cl.
CPC ............ *G03B 21/608* (2013.01); *A63J 5/025* (2013.01); *G03B 21/12* (2013.01); *G03B 35/20* (2013.01); *H04N 9/3164* (2013.01)

(58) Field of Classification Search
CPC ........ G03B 21/12; G03B 21/14; G03B 21/56; G03B 21/145; G03B 21/562; G03B 21/608; G03B 35/00; G03B 35/08; G03B 35/20; H04N 9/3141; H04N 9/3152; H04N 9/3161; H04N 9/3164; A63J 5/00; A63J 5/025; A63J 5/028; A01G 31/00; A01G 31/02; A01G 31/022
See application file for complete search history.

(56) References Cited

U.S. PATENT DOCUMENTS

2013/0003020 A1* 1/2013 Koehler ............... H04N 13/363
                                                     353/7
2014/0320824 A1* 10/2014 Kim ................... H04N 21/4122
                                                     353/30
2022/0100072 A1* 3/2022 Yokoo ................. G03B 21/608

* cited by examiner

*Primary Examiner* — Sultan Chowdhury
(74) *Attorney, Agent, or Firm* — Foley & Lardner LLP

(57) ABSTRACT

A system may comprise a fog generating unit configured to generate fog; a fog distributing unit comprising: an intake component configured to receive the fog generated by the fog generating unit, a fog manifold configured to receive the fog from the intake component and separate the fog into a plurality of fog portions, a fog laminar assembly comprising a plurality of laminar portions configured to receive the plurality of fog portions and generate a plurality of laminar flows of fog using the plurality of fog portions; and a plurality of light sources configured to illuminate the plurality of laminar flows of fog to create a plurality of images, of an item, on the plurality of laminar flows of fog.

19 Claims, 4 Drawing Sheets

200

200

SYSTEM FOR GENERATING A 360 DEGREE VIEWABLE IMAGE ON LAMINAR FOG SCREEN

BACKGROUND

A fog screen is a system that use water vapors to create a semi-transparent wall of suspended water particles. The water particles are trapped in a thin sheet of air. The water particles may be illuminated with an image projector to produce a display of images. The display of images may appear to be floating in the air.

SUMMARY

A system may comprise a fog generating unit configured to generate fog; a fog distributing unit comprising: an intake component configured to receive the fog generated by the fog generating unit, a fog manifold configured to receive the fog from the intake component and separate the fog into a plurality of fog portions, a fog laminar assembly comprising a plurality of laminar portions configured to receive the plurality of fog portions and generate a plurality of laminar flows of fog using the plurality of fog portions; and a plurality of light sources configured to illuminate the plurality of laminar flows of fog to create a plurality of images, of an item, on the plurality of laminar flows of fog.

A system, comprising: a fog generating unit configured to generate fog; a fog distributing unit comprising: a fog manifold configured to receive the fog and separate the fog into a plurality of fog portions, a fog laminar assembly comprising a plurality of laminar portions configured to receive the plurality of fog portions and generate a plurality of laminar flows of fog using the plurality of fog portions, wherein a first laminar portion, of the plurality of laminar portions, is configured to receive a first fog portion, of the plurality of fog portions, and generate a first laminar flow of fog of the plurality of laminar flows of fog; and a plurality of light sources configured to illuminate the plurality of laminar flows of fog to create images of an item on the plurality of laminar flows of fog.

A system, comprising: a fog generating unit configured to generate fog; and a fog distributing unit comprising: an intake component configured to receive the fog generated by the fog generating unit, a fog manifold configured to receive the fog from the intake component and separate the fog into a plurality of fog portions, a fog laminar assembly comprising a plurality of laminar portions configured to receive the plurality of fog portions and generate a plurality of laminar flows of fog using the plurality of fog portions, wherein a laminar portion, of the plurality of laminar portions, is configured to receive a fog portion of the plurality of fog portions and generate a laminar flow of fog of the plurality of laminar flows of fog, and wherein the laminar flow of fog is configured to receive light from a respective light source, of a plurality of light sources, to create an image of an item on the laminar flow of fog.

DETAILED DESCRIPTION

Figure 1:
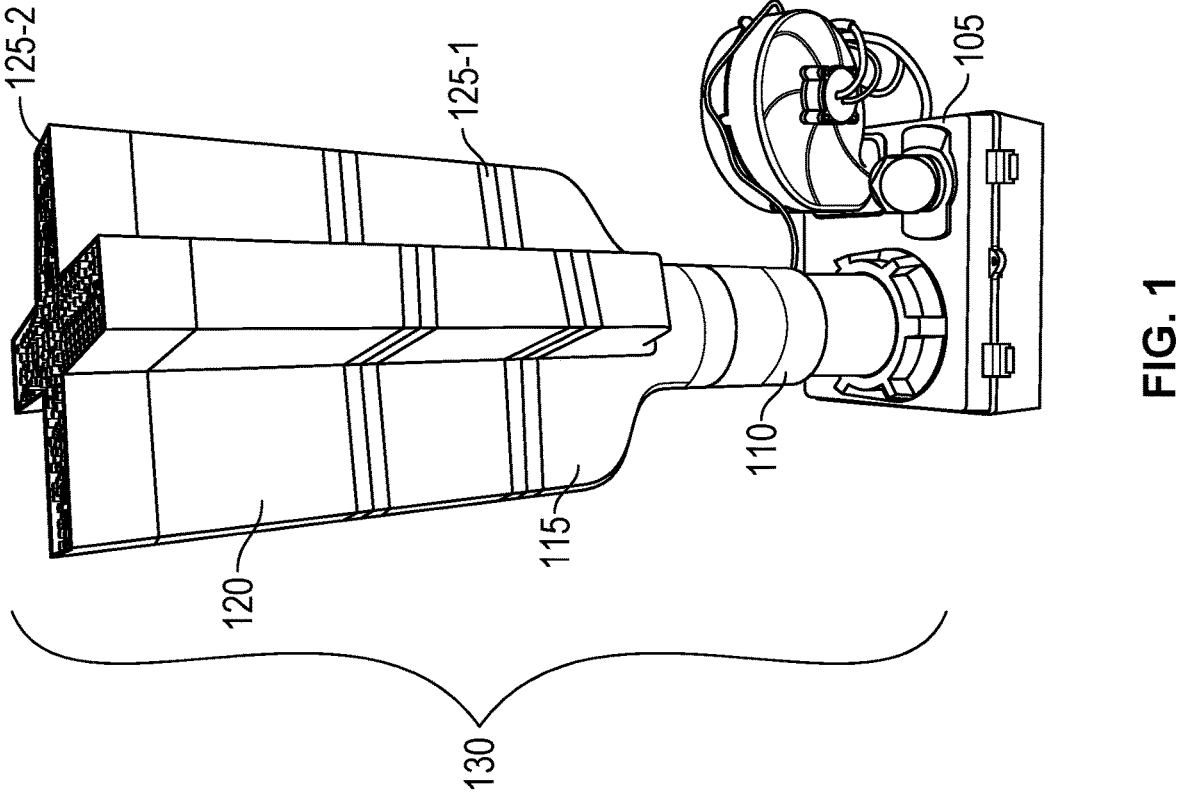
FIG. 1 is a diagram of an example system described herein.

The following detailed description of example implementations refers to the accompanying drawings. The same reference numbers in different drawings may identify the same or similar elements.

Special lighting and visual effects may be provided at a venue. The special lightning and visual effects may include holographic images, floating images, among other examples. In some situations, a fog screen may be used to provide the special lighting and visual effects. For example, water particles of the fog screen may be illuminated with an image projector to produce a display of images. Typically, the fog screen may originate from a ceiling and the water particles may travel downward from the ceiling toward a floor surface.

In some situations, two image projectors may be used to create a three-dimensional (3D) image. While the fog screen and the two image projectors may be used to create the 3D image, a need currently exists to create a 360-degree viewable image. A 360-degree viewable image may be used to refer to an image that is viewable from multiple angles (e.g., viewable from 360 degrees). Additionally, a need currently exists to enable the 360-degree viewable image to be touched by guests. Furthermore, a need currently exists to enable the 360-degree viewable image to be visible in an environment that is illuminated.

Unsuccessful attempts have been made to create the 360-degree viewable image described above. At best, the unsuccessful attempts result in a 3D image generated using a single fog screen (e.g., a single sheet of fog screen). The single sheet of fog screen comprises water droplets and typically flows in a downward direction. The water droplets are generated as a result of water compression. Because the image is generated using a single sheet of fog screen, the image is only viewable from a limited range of angles. For example, the image is only viewable from a single side of the single sheet of fog screen (e.g., from a front portion of the single sheet of fog screen).

Additionally, the water droplets of the unsuccessful attempts are subject to limited velocity because of the limited height of the fog screen. Accordingly, the single sheet of fog screen is subject to being disturbed by ambient room air flow and/or by air flow of an HVAC system. Additionally, the limited velocity of the water droplets negatively affects the image being viewed by guests.

Implementations described herein are directed to a system that generates a 360-degree viewable image on a fog screen. For example, the system includes a fog generating unit, a fog distribution unit, and a plurality of light sources. The fog generating unit may be configured to generate fog. The fog distribution unit may include an intake component configured to receive the fog generated by the fog generating unit, a fog manifold configured to receive the fog from the intake portion and separate the fog into a plurality of fog portions, and a fog laminar assembly comprising a plurality of laminar portions.

In some implementations, the fog laminar assembly may be a geometric shape. For example, the fog laminar assembly may be shaped as an "X." For example, the fog laminar assembly may comprise four laminar portions shaped as an "X." In this regard, the fog manifold may separate the fog into four fog portions and the four laminar portions may generate four laminar flows of fog using the four fog portions. As used herein, a "laminar flow of fog" may be used to refer to a flow of water droplets in parallel streams or in parallel layers, as opposed to a flow of water subject to turbulence. The flow of water droplets may include vapors of water droplets. The laminar flows of fog may be fog projection surfaces.

In this regard, the fog laminar assembly may be used in conjunction with multiple light sources. For example, the fog laminar assembly may be used in conjunction with four light sources and each light source may be positioned to emit light on a respective fog projection surface. Each light source may emit light on a respective fog projection surface to generate an image of an item on the respective fog projection surface.

As an example, a first light source may emit a first light to generate a first image of a first side of the item, a second light source may emit a second light to generate a second image of a second side of the item, and so on. The sides of the item may include a front side, a rear side, a right side, and a left side. As a result of the light sources projecting the light as described herein, the fog laminar assembly and the light sources may generate a 360-degree viewable image of the item on the fog projection surfaces.

For example, the fog laminar assembly and the light sources may generate a bright and clear floating image (of the item) that enables a guest to walk around to view the item from multiple angles. As used herein, the term "guest" may broadly be used to refer to a person, a party, a patron, and/or a passenger, among other examples.

The laminar flows of fog consist of water vapor fog. Accordingly, the light emitted by the light sources is very directional through the water droplets which makes the floating image very bright and easily seen in an environment that is well illuminated. As used herein, "water vapor fog" may be used to refer to water vapor that generates fog.

The fog laminar assembly may comprise a plurality of conduits configured to receive the plurality of fog portions and transport the plurality of fog portions outwardly from the laminar portions. In some implementations, the length of the laminar flows of fog may be based on the length of the plurality of conduits. Accordingly, the height of the floating image may be based on the length of the plurality of conduits.

For example, the length of the laminar flows of fog may be proportional to the length of the plurality of conduits the heigh of the floating image. Accordingly, the height of the floating image may be proportional to the length of the plurality of conduits. As an example, the height of the image may be up to 20 inches tall.

Additionally, the water vapor fog may be moving at a velocity that prevent the water droplets from being affected by ambient air. Accordingly, the velocity of the water vapor fog may prevent the plurality of fog portions from being disturbed by ambient air. Additionally, the limited velocity of the water droplets negatively affects the image being viewed by guests.

Based on the foregoing, the system described herein generates, on a fog screen, a 360-degree viewable image that is not subject to disturbance by ambient air and that is visible in environments that are well illuminated. The system may be used as a centerpiece option at a venue e.g., in addition to or in alternative to a fountain). Additionally, the system may be used as a way finding tool (e.g., floating arrows). While the fog laminar assembly is described herein as having an "X" shape, the fog laminar assembly may have different shapes for different use cases.

FIG. 1 is a diagram of an example system 100 described herein. As shown in FIG. 1, system 100 may include a fog generating unit 105, an intake component 110, a fog manifold 115, and a fog laminar assembly 120. Intake component 110, fog manifold 115, and fog laminar assembly 120 may be part of a fog distribution unit 130.

Fog generating unit 105 may include one or more devices configured to generate fog. For example, fog generating unit 105 may generate water vapor and cause the water vapor to condense and to thereby generate fog. In some implementations, fog generating unit 105 may be a fog machine. For example, fog generating unit 105 may be an ultrasonic fog machine or ultrasonic fog generator. Alternatively, fog generating unit 105 may be a glycol fog machine. Fog generating unit 105 may be a fog collection unit.

In some situations, fog generating unit 105 may include a container (or similar component) that is pressurized. For example, fog generating unit 105 may cause the fog to be pressurized to cause the fog to exit toward intake component 110. For instance, fog generating unit 105 may cause the fog to be pressurized to cause an upward movement of water droplets that are part of the fog. Fog generating unit 105 may be a fog plenum. In some implementations, fog generating unit 105 may include a mechanism that is used to pressurize the fog and move the fog through fog generating unit 105. For example, the mechanism may include a squirrel cage fan, a standard radial fan, and/or a regulator and a compressor configured to generate compressed air.

In some examples, fog generating unit 105 may be configured to homogenize the fog to cause a steady stream of fog exiting fog generating unit 105. Fog generating unit 105 may be configured to generate a continuous stream of fog that is provided to intake component 110.

Intake component 110 may one or more devices configured to receive the continuous stream of fog from fog generating unit 105 and provide the continuous stream of fog to fog manifold 115. For example, intake component 110 may be a conduit that receives the continuous stream of fog from fog generating unit 105 and provides the continuous stream of fog to fog manifold 115. In some implementations, intake component 110 may be a cylindrical component. For example, the shape of intake component 110 may be a cylinder.

Fog manifold 115 may be configured to receive the continuous stream of fog from intake component 110 and separate the continuous stream of fog into a plurality of fog portions. In some implementations, fog manifold 115 may include vanes (not shown) that are configured to separate the continuous stream of fog into the plurality of fog portions, thereby directing the plurality of fog portions of the continuous stream of fog to fog laminar assembly 120.

In some examples, fog manifold 115 may include a plurality of manifold portions. Each manifold portion may be configured to receive a respective fog portion of the plurality of portions. The plurality of fog portions, of the continuous stream of fog, may be provided to fog laminar assembly 120. For example, each manifold portion may provide a respective fog portion to a respective laminar portion of fog laminar assembly 120.

Fog laminar assembly 120 may include a plurality of laminar portions configured to receive the plurality of fog portions and generate a plurality of laminar flows of fog using the plurality of fog portions. For example, each laminar portion may receive a respective fog portion from a respective manifold portion and may generate a respective laminar flow of fog.

As shown in FIG. 1, fog laminar assembly 120 may include a bottom portion 125-1 and a top portion 125-2. Additionally, fog laminar assembly 120 may include a plurality of conduits configured to transport the plurality of fog portions from bottom portion 125-1 to top portion 125-2 and, subsequently, outwardly from top portion 125-2. In some examples, the plurality of conduits may extend from bottom portion 125-1 to top portion 125-2.

The number and arrangement of devices shown in FIG. 1 are provided as an example. Furthermore, two or more devices shown in FIG. 1 may be implemented within a single device, or a single device shown in FIG. 1 may be implemented as multiple, distributed devices.

Figure 2:
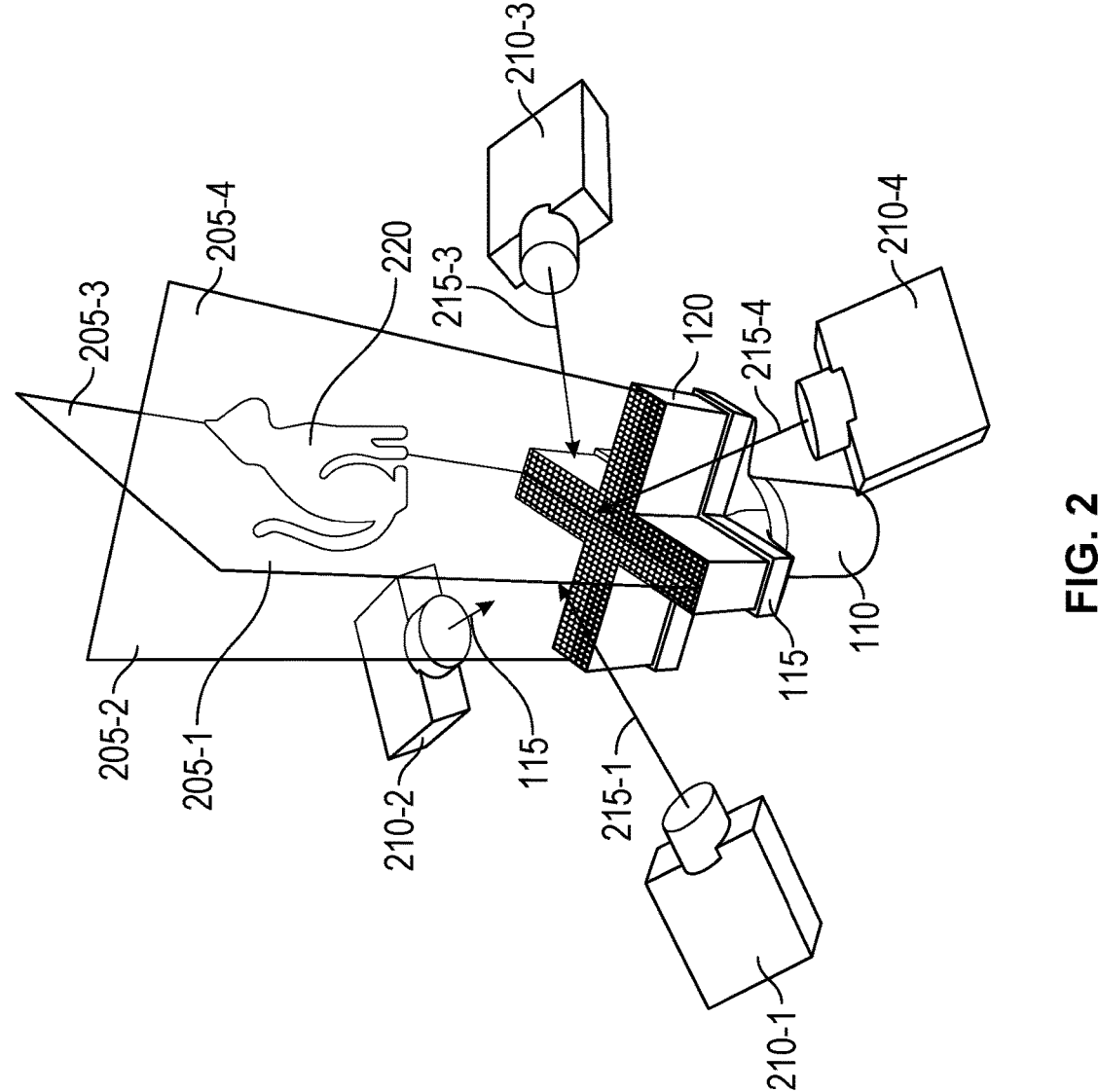
FIG. 2 is a diagram of an example system described herein.

FIG. 2 is a diagram of an example system 200 described herein. Elements of system 100 have been described above in connection with FIG. 1. As shown in FIG. 2, system 200 may include fog distribution unit 130, a first light source 210-1, a second light source 210-2, a third light source 210-3, and a fourth light source 210-4. First light source 210-1, second light source 210-2, third light source 210-3, and fourth light source 210-4 may be collectively referred to as light sources 210 and individually referred to as light source 110.

As shown in FIG. 2, fog laminar assembly 120 may generate a plurality of laminar flows of fog. For example, a first laminar portion may generate a first laminar flow of fog 205-1, a second laminar portion may generate a second laminar flow of fog 205-2, a third laminar portion may generate a third laminar flow of fog 205-3, and a fourth laminar portion may generate a fourth laminar flow of fog 205-4.

First laminar flow of fog 205-1, second laminar flow of fog 205-2, third laminar flow of fog 205-3, and fourth laminar flow of fog 205-4 may be collectively referred to as laminar flows of fog 205 and individually as laminar flow of fog 205. Each laminar flow of fog 205 may be a sheet of water droplets. In some implementations, a size of a water droplet may be 10 nanometer. A thickness of each laminar flow of fog 205 may enable an image, formed on laminar fog 205, to be clear and/or to be vivid (e.g., not dim). Each laminar flow of fog 205 may form a projection surface for a respective light source 210.

In some examples, a light source 210 may be a projector (e.g., an image projector and/or a video projector). The light source 210 may be configured to create an image on a respective laminar flow of fog 205 by emitting a light through a small transparent lens (e.g., a transparent lens with a size that is less than a size threshold). Additionally, or alternatively, light source 210 may be configured to create the image on the respective laminar flow of fog 205 by projecting the image using one or more lasers.

As shown in FIG. 2, each light source 210 may be provided at a respective angle formed by two laminar portions of fog laminar assembly 120. For example, first light source 210-1 may be provided at an angle formed by a first laminar portion and a second laminar portion, second light source 210-2 may be provided at an angle formed by the second laminar portion and a third laminar portion, and so on.

Each light source 210 may project a light at the respective angle. For example, first light source 210-2 may project light 215-1 at the angle formed by the first laminar portion and the second laminar portion, second light source 210-2 may be project light 215-2 at the angle formed by the second laminar portion and a third laminar portion, and so on.

In some examples, each light source 210 may project light to generate an image of a different side of an item 220. For example, first light source 210-2 may project light 215-1 to generate an image of a front side of item 220, second light source 210-2 may be project light 215-2 to generate an image of a right side of item 220, and so on. By generating an image of a different side of item 220, a 360 degree viewable image of item 220 may be created.

Alternatively, each light source 210 may project light to generate an image of a same side of item 220. Projecting light at an angle, as described herein, may provide benefits over projecting light on a thick projection surface made of water droplets. For example, the image projected on the thick projection surface may be dim and may lack clarity.

In contrast, because of the thickness of a laminar flow of fog 205, projecting the light at the angle may generate an image that is clear and that is vivid. The thickness of the thick projection surface may satisfy a thickness threshold while the thickness of the laminar flow of fog 205 may not satisfy the thickness threshold. In some implementations, the thickness threshold may be determined by an operator of fog distribution unit 130.

In some implementations, the fog screen created by fog distribution unit 130. may be a very directional rear projection surface. Accordingly, when a light source 210 projects on the fog screen, the light may have a very narrow viewing area (e.g., an image viewing cone). This narrow viewing area may allow for 4 separate different projections to be on the fog screen and only one at a time to be seen based on a viewing angle of a guest. Alternatively, a same image may be projected 4 times in a radial arrangement to mimic or give the illusion of the same image being seen from multiple angles.

The number and arrangement of elements shown in FIG. 2 are provided as an example.

Figure 3:
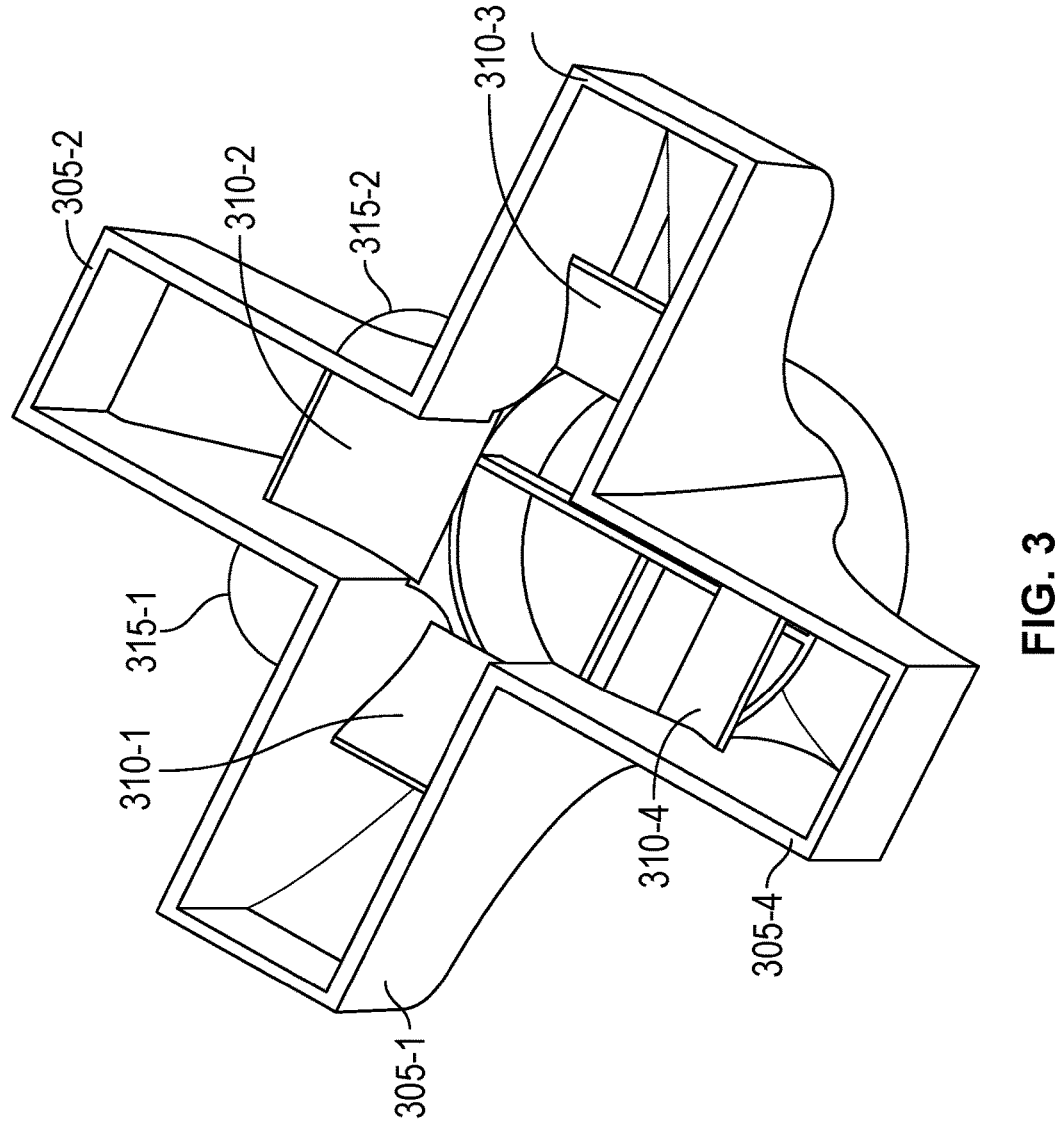
FIG. 3 is a diagram of an example fog manifold described herein.

FIG. 3 is a diagram of an example fog manifold 115 described herein. As shown in FIG. 3, fog manifold 115 may include a plurality of manifold portions. For example, fog manifold 115 may include a first manifold portion 305-1, a second manifold portion 305-2, a third manifold portion 305-3, and a fourth manifold portion 305-4 (collectively manifold portions 305 and individually manifold portion 305).

As shown in FIG. 3, each manifold portion 305 may include a guiding element configured to direct a respective fog portion toward a respective laminar portion. For example, first manifold portion 305-1 may include a first guiding element 310-1, second manifold portion 305-2 may include a second guiding element 310-2, third manifold portion 305-3 may include a third guiding element 310-3, and fourth manifold portion 305-4 may include a fourth guiding element 310-4. First guiding element 310-1, second guiding element 310-2, third guiding element 310-3, and fourth guiding element 310-4 may be collectively referred to as guiding elements 310 and individually as a guiding element 310.

In some examples, a guiding element 310 may be a vane, a baffle, among other examples of components that are configured to direct air. As shown in FIG. 3, adjacent manifold portions may form an angle. For example, first manifold portion 305-1 and second manifold portion 305-2 may form a first angle 315-1, second manifold portion 305-2 and third manifold portion 305-3 may form a second angle 315-2, and so on.

In some examples, the angles may be of equal value. For example, first angle 315-1 and second angle 315-2 may be 90 degrees. Alternatively, the angles may be of different values.

The number and arrangement of elements shown in FIG. 3 are provided as an example.

Figure 4:
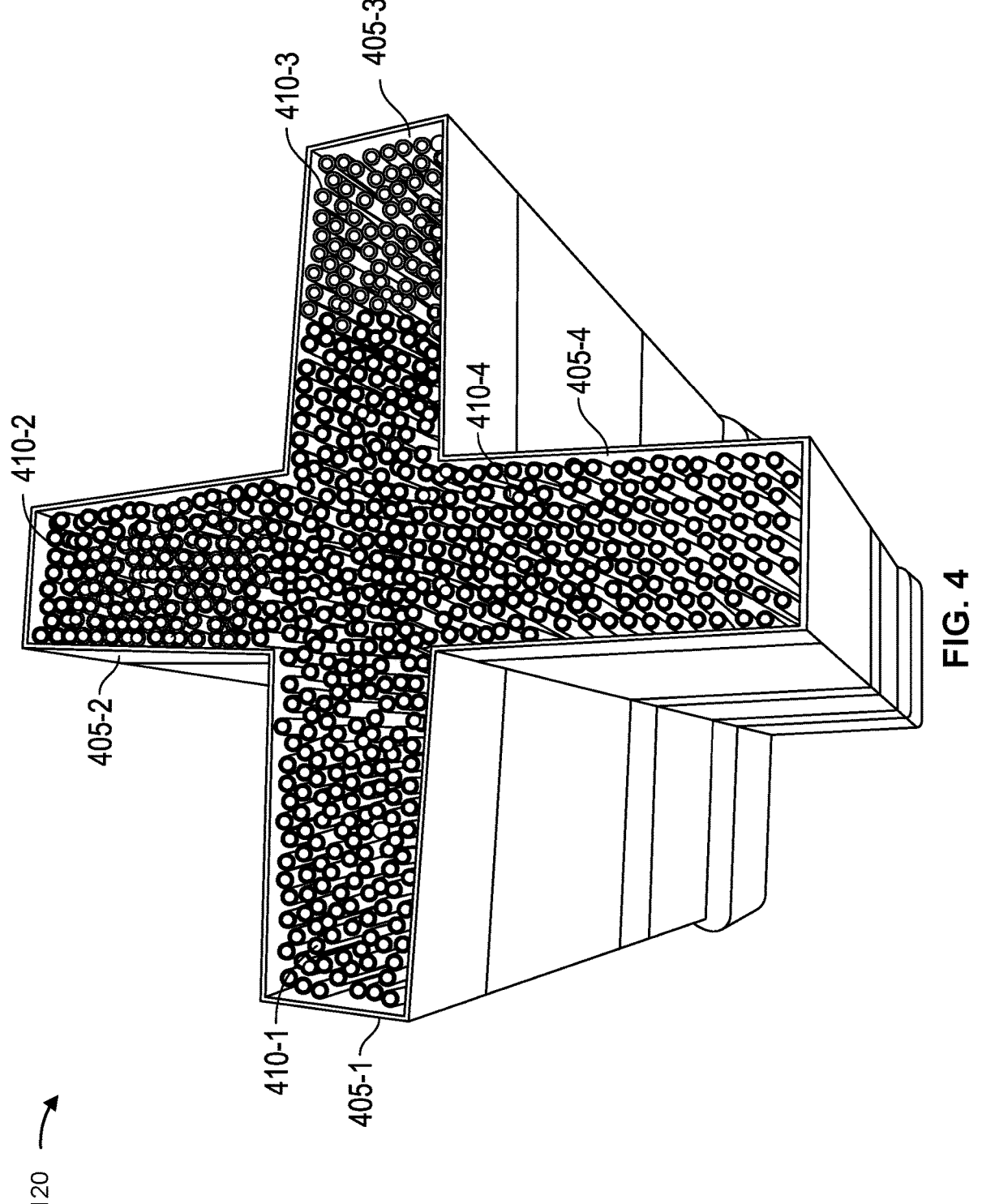
FIG. 4 is a diagram of example fog laminar assembly described herein.

FIG. 4 is a diagram of example viewpoints described herein. As shown in FIG. 4, fog manifold 115 may include a plurality of laminar portions. For example, fog laminar assembly 120 may include a first laminar portion 405-1, a second laminar portion 405-2, a third laminar portion 405-3, and a fourth laminar portion 405-4 (collectively laminar portions 405 and individually laminar portion 405).

As shown in FIG. 4, adjacent laminar portions 405 may form an angle. For example, first laminar portion 405-1 and second laminar portion 405-2 may form a first angle, second laminar portion 405-2 and third laminar portion 405-3 may form a second angle, and so on. In some examples, the angles may be of equal value. For example, the angles may be 90 degrees. Alternatively, the angles may be of different values.

As shown in FIG. 4, each laminar portion 405 may include a plurality of conduits. For example, first laminar portion 405-1 may include a first plurality of conduits 410-1, second laminar portion 405-2 may include a second plurality of conduits 410-2, third laminar portion 405-3 may include a third plurality of conduits 410-3, and fourth laminar portion 405-4 may include a fourth plurality of conduits 410-4. Each conduit may be referred to as a conduit 410 and collectively as conduits 410.

A conduit 410 may extend from bottom portion 125-1 and top portion 125-2. The conduit 410 may be configured to guide water droplets, of a fog portion, received from fog manifold 115 to top portion 135-2 and outward from a respective laminar portion 405. The conduit 410 may cause the continuous flow of fog to be directional and straight.

As shown in FIG. 4, the cross-section of the conduit 410 may be a circle. In some implementations, a diameter of the conduit 410 may be from approximately 0.3 inches to approximately 2 inches. The diameter of the conduit 410 may be configured to provide a balance between causing the laminar flow of fog to be directional without condensing and without being subject to turbulence. For example, as the diameter decreases, the laminar flow of fog may become more directional and less subject to turbulence up to a certain diameter that inhibits the flow of fog and causes condensation. In some examples, the conduit 410 may have a cylindrical shape.

In some examples, conduits 410 may be provided in a manner that causes them to tightly fit together (e.g., in manner that eliminates or reduces any spacing between the conduits 410). By eliminating or reducing the spacing between the plurality of conduits, a flow of turbulent fog may be eliminated or reduced. In some implementations, the conduits 410 may be arranged to form a honeycomb.

In some implementations, a mask may be provided at bottom portion 125-1 to eliminate or reduce the flow of turbulent fog. For example, the mask may include a plurality of openings configured to receive conduits 410. For instance, each opening, of the plurality of openings, may be configured to receive a respective conduit 410.

The number and arrangement of elements shown in FIG. 4 are provided as an example.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A system, comprising:
a fog distributing unit having a fog manifold in communication with a fog laminar assembly,
the fog manifold configured to receive fog from the intake component and separate the fog into a plurality of fog portions, and
the fog laminar assembly comprising:
a plurality of laminar portions positioned to receive the plurality of fog portions and generate a plurality of laminar flows of fog from the plurality of fog portions, and
a fog screen formed by the plurality of laminar flows, the fog screen positioned adjacent the fog laminar assembly to receive light from a light source to display an image.

2. The system of claim 1, wherein the plurality of laminar portions include a first laminar portion, a second laminar portion, a third laminar portion, and a fourth laminar portion,
the first laminar portion and the second laminar portion to form a first angle,
the second laminar portion and the third laminar portion to form a second angle,
the third laminar portion and the fourth laminar portion to form a third angle, and
the fourth laminar portion and the first laminar portion to form a fourth angle.

3. The system of claim 2, wherein the first angle, the second angle, the third angle, and the fourth angle are of equal value.

4. The system of claim 1, wherein the plurality of laminar portions include a first laminar portion, the plurality of fog portions includes a first fog portion, and the plurality of laminar flows includes a first laminar flow of fog, the first laminar portion configured to receive the first fog portion and generate the first laminar flow of fog using the first fog portion.

5. The system of claim 4, wherein the first laminar portion includes a plurality of conduits to receive and transport the first fog portion,
a first length of the plurality of laminar flows is proportional to a second length of the plurality of conduits.

6. The system of claim 4, wherein the plurality of laminar portions further includes a second laminar portion, the plurality of fog portions further includes a second fog portion and the plurality of laminar flows further includes a second laminar flow of fog, and
wherein the second laminar portion is configured to:
receive the second fog portion of the plurality of fog portions; and
generate the second laminar flow of fog using the second fog portion.

7. The system of claim 6, further comprising the light source, wherein the light source includes a first light emitting source to emit a first light on the first laminar flow of fog, and the light source further includes a second light emitting source to emit a second light on the second laminar flow of fog.

8. The system of claim 7, wherein the image is a three-dimensional image comprising light emitted from the first light emitting source and the second light emitting source.

9. The system of claim 1, further comprising a fog generating unit configured to generate the fog, the fog distributing unit further comprising an intake component to receive the fog generated by the fog generating unit and distribute the fog to the fog manifold.

10. The system of claim 1, wherein the fog manifold includes a first manifold portion, the first manifold portion including a guiding element configured to direct a portion of the fog to one of the plurality of laminar portions.

11. A system, comprising:
a fog generating unit configured to generate fog;
a fog distributing unit in communication with the fog generating unit, the fog distributing unit comprising:
a fog manifold configured to receive the fog and separate the fog into a plurality of fog portions, and
a fog laminar assembly comprising a plurality of laminar portions configured to receive the plurality of fog portions and generate a plurality of laminar flows of fog using the plurality of fog portions, the plurality of laminar portions including a first laminar portion configured to receive a first fog portion of the plurality of fog portions and generate a first laminar flow of fog of the plurality of laminar flows of fog; and
at least one light source configured to illuminate the plurality of laminar flows of fog to create at least one image of an item on the plurality of laminar flows of fog.

12. The system of claim 11, wherein the at least one light source includes a first light emitting source and a second light emitting source,
the first light emitting source configured to emit a first light that creates a first image of a first side of the item,
the second light emitting source configured to emit a second light that creates a second image of a second side of the item.

13. The system of claim 12, wherein the first side of the item is different than the second side of the item.

14. The system of claim 12, wherein the first side of the item is the same as the second side of the item.

15. The system of claim 11, further comprising:
an intake component configured to receive the fog generated by the fog generating unit,
wherein the fog manifold is further configured to receive the fog from the intake component.

16. The system of claim 11, wherein:
the first laminar portion includes a plurality of conduits;
the first laminar flow of fog to extend outwardly from the first laminar portion; and
a first length of the first laminar flow of fog is proportional to a second length of the plurality of conduits.

17. A system, comprising:
a fog generating unit configured to generate fog; and
a fog distributing unit in communication with the fog generating unit, the fog distributing unit comprising:
an intake component configured to receive the fog generated by the fog generating unit,
a fog manifold configured to receive the fog from the intake component and separate the fog into a plurality of fog portions, and
a fog laminar assembly comprising a plurality of laminar portions configured to receive the plurality of fog portions and generate a plurality of laminar flows of fog using the plurality of fog portions, the plurality of laminar flows of fog including a first laminar flow of fog;
wherein the plurality of laminar portions include a first laminar portion configured to receive a first fog portion of the plurality of fog portions and generate the first laminar flow of fog; and wherein the first laminar flow of fog is configured to receive light from a light source to create an image of an item on the first laminar flow of fog.

18. The system of claim 17, wherein the light source comprises a first light source and a second light source and the image of the item comprises a first image and a second image, the first light source is configured to emit first light to create the first image of a first side of the item, the second light source is configured to emit second light to create the second image of a second side of the item.

19. The system of claim 17, further comprising a first light source, the first light source to illuminate the first laminar portion and a second laminar portion of the plurality of laminar portions at a first angle.

* * * * *